US005096767A

United States Patent [19]

Harada et al.

[11] Patent Number: 5,096,767

[45] Date of Patent: Mar. 17, 1992

[54] ALKALI-REMOVABLE LABEL SUPPORT AND LABEL

[75] Inventors: Junji Harada; Takahisa Kato; Seigo Ebato; Hideki Sekiguchi, all of Tokyo, Japan

[73] Assignee: Mitsubishi Paper Mills Limited, Tokyo, Japan

[21] Appl. No.: 473,170

[22] Filed: Jan. 31, 1990

[30] Foreign Application Priority Data

Feb. 3, 1989 [JP] Japan .................................... 1-25125
Oct. 4, 1989 [JP] Japan .................................... 1-260835

[51] Int. Cl.[5] .............................................. B32B 27/10

[52] U.S. Cl. .................................... 428/204; 428/209; 428/211; 428/537.5

[58] Field of Search ............... 428/457, 195, 204, 209, 428/211, 537.5; 156/236

[56] References Cited

U.S. PATENT DOCUMENTS 4,370,377 1/1983 Brugmans ............................ 428/327

FOREIGN PATENT DOCUMENTS

2927511A1 1/1981 Fed. Rep. of Germany .
163294 12/1980 Japan .
68186 6/1981 Japan .
222873 12/1984 Japan .
162642 8/1985 Japan .
185575 8/1986 Japan .

*Primary Examiner*—Thomas J. Herbert, Jr.
*Attorney, Agent, or Firm*—Finnegan, Henderson, Farabow, Garrett & Dunner

[57] ABSTRACT

A support for an alkali-removable label in the form of a paper label having excellent water resistance and good bottle washing suitability to remove the label and also a label made from such a support. The support consists of a base paper having on a surface thereof an anchor layer produced by applying a radiation-curable composition comprising a radiation-curable resin and a radiation-curable carboxylic acid or a mixture of a monofunctional radiation-curable carboxylic acid and a polyfunctional radiation-curable carboxylic acid and curing the resultant coating by radiation. An intermediate layer comprising a water-soluble polymer or a water-dispersed polymer may be interposed between the base paper and the anchor layer.

18 Claims, 1 Drawing Sheet

ALKALI-REMOVABLE LABEL SUPPORT AND LABEL

BACKGROUND OF THE INVENTION

1. Field of the invention:

The present invention relates to a support for an alkali.removable label used for a beer bottle etc. More particularly, this invention is concerned with a support for a label which is used for providing an alkali removable label having excellent water resistance and excellent bottle washing suitability.

2. Description of the Prior Art:

A lacquer of a nitrocellulose resin, an acrylic resin, a urethane resin, or a vinyl chloride/vinyl acetate copolymer resin has been used as an anchor layer on a support for the purpose of preparing a highly glossy and water-resistant paper label for a beer bottle etc. or preparing a metallized label. However, when the above-described resin is used, the resultant label is poor in the bottle washing suitability, which renders the label unsuitable for use as an alkali-removable label for a returnable bottle. In bottle washing, a returned bottle is immersed in a 1 to 4 % aqueous sodium hydroxide solution having a high temperature to remove the label from the bottle. When the label is easily washed off by the above-described means, such a label is hereinafter defined as having good suitability for bottle washing. The suitability is evaluated based on the time taken from immersion of the returned bottle to removing of the label. For the purpose of improving the suitability for bottle washing, in Japanese Patent Application Laid-Open No. 222873/1984, a proposal has been made to use as the anchor layer a resin comprising a maleic acid-containing aminoalkyd resin; a maleic resin; a resin comprising a nitrocellulose resin and a fatty acid ester added thereto; or an acrylic resin comprising a copolymer of a methacrylic ester with an acrylic ester and acrylic acid. Use of the above-described anchor layer contributed to an improvement in the bottle washing suitability but brought about drawbacks such as insufficient gloss, occurrence of many pinholes which renders the support unsuitable as a support for a label, large curling which hinders subsequent steps such as printing and application to a bottle, and occurrence of cracking on a metallized surface when a metallized label is formed and then immersed into water.

In Japanese Patent Application Laid-Open Nos. 163294/1980 and 185575/1986, a proposal has been made of a method which comprises applying an electron beam-curable composition on a support and irradiating the resultant coating with an electron beam, thereby forming an anchor layer for aluminum metallization. The support for a label thus formed has the advantages of as high gloss, water resistance and an improvement in adhesion to aluminum but is poor in suitability for bottle washing, which renders the support unsuitable for use in an alkali-removable label. For the purpose of improving the suitability for bottle washing, in Japanese Patent Application Laid-Open No. 68186/1981, a proposal has been made to incorporate into an electron beam. curable composition a compound having a combination of a polymerizable double bond with a tertiary amino group and a hydroxyl group and/or an ether bond, or a quaternary ammonium salt. However, this method has the problems that no intended gloss can be obtained, water resistance is insufficient and cracking occurs on a metallized surface when a metallized label is formed and then immersed into water.

Use of the above-described anchor layers contributed to an improvement in bottle washing suitability, but brought about drawbacks such as insufficient gloss, occurrence of many pinholes which rendered the support unsuitable as a support for a label, large curling which hindered subsequent steps such as metallization, printing and application to a bottle, and occurrence of cracking when a label is formed with the support and then immersed into water.

A first object of the present invention therefore is to provide an alkali-removable label support and a label made therefrom wherein an anchor layer is provided on base layer for the purpose of improving the labels suitability for bottle washing while, at the same time, providing a support for a label that has sufficient gloss, less number of pinholes and less degree of curling, is suitable for use in subsequent steps such as metallization, printing or application to a bottle and has water resistance sufficient to prevent occurrence of cracking when immersed in water.

A second object of the present invention is to provide a support for an alkali-removable label and a label made therefrom wherein an intermediate layer is used to prevent the resin composition applied to base layer for the purpose of forming the above-described anchor layer from penetrating into the base layer is provided.

A third object of the present invention is to provide a support for an alkali-removable label and a label made therefrom which, when immersed in an alkaline solution to remove the label from a bottle, causes the anchor layer to rapidly swell without dissolution and be washed off in film form, thus enabling the label and the anchor layer to be easily recovered and causing no deterioration of the alkali solution.

SUMMARY FO THE INVENTION

The present invention provides the following alkali removable label supports and a label made therefrom:

(1) A support for an alkal comprising a base layer and, on at least one surface thereof, an anchor layer produced by applying a radiation-curable composition composed of an electron beam. and/or ultraviolet-curable resin and a radiation-curable carboxylic acid and optionally, added thereto, a photopolymerization initiator, one and irradiating the resultant layer with a radiation to cure the layer.

The electron beam and ultraviolet ray are hereinafter collectively referred to as "radiation."

(2) A support for an alkali-removable label, comprising a base layer and on at least one surface thereof, in the following order, an intermediate layer comprised of a water soluble polymer and/or a water dispersed polymer and an anchor layer produced by applying a radiation-curable composition comprised of a radiation-curable carboxylic acid on said intermediate layer and irradiating the resultant anchor layer with radiation.

(3) A support for an alkali-removable label, comprising a base paper and on at least one surface thereof, in the following order, an intermediate layer comprised of a water.soluble polymer and/or a water. dispersed polymer and an anchor layer produced by applying on said intermediate layer a radiation-curable composition comprised of a monofunctional radiation. curable carboxylic acid and a polyfunctional radiation. curable carboxylic acid and irradiating the resultant anchor layer with radiation.

The content of the monofunctional radiation-curable carboxylic acid in the resin composition is preferably 5 to 80 % by weight.

DETAILED DESCRIPTION OF THE INVENTION

The present invention relates to a label for use on a returnable bottle, and more particularly to support for an alkali-removable label. The support for an alkali. removable label according to the present invention is not only excellent in gloss, particularly after metallization or printing, but also is less susceptible to occurrence of a pinhole and curling, brings about no cracking when immersed in water, and is rapidly washed off from a bottle during washing of the bottle in an alkali bath.

Figure 1:
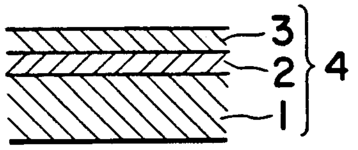
FIG. 1 is a schematic cross.sectional view of an example of the support for an alkali-removable label according to the present invention.

With reference to FIG. 1, a base paper 1 has clay coated layer or a water-soluble polymer aw in intermediate layer 2 provided thereon, and a radiation.cured anchor layer 3 is provided thereon to form a support 4 for an alkali-removable label.

Figure 2:
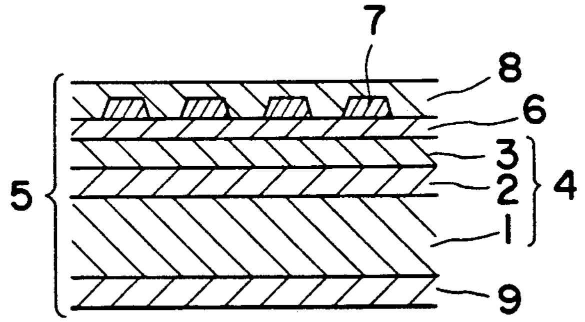
FIG. 2 is a schematic cross.sectional view of another example of a label provided with a support for an alkali-removable label according to the present invention.
Figure 3:
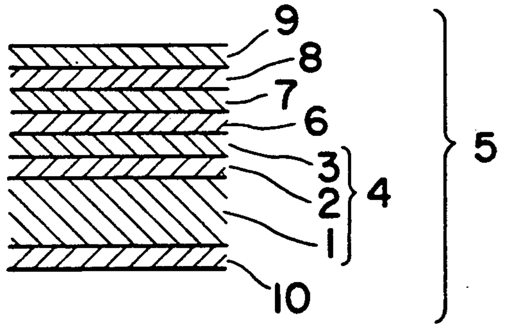
FIG. 3 is a schematic cross.sectional view of an example of a metallized label comprising a support for an alkali-removable label according to the present invention and a metal evaporated layer provided thereon.

With reference to FIG. 2, a primer layer 6, a printing layer 7 and an overcoat layer 8 are successively provided on support 4 for an alkali-removable label. If necessary, an adhesive layer 9 may be provided on the back side of support 4 FIG. 3 shows a metallized label 5 comprising a support 4 having a metal evaporated or metallized layer 6, a primer layer, a printing layer 8 and an overcoat layer 9 provided on the support in that order and an adhesive layer 10 provided on the back side of the support.

In the present invention, unsaturated polyesters, modified unsaturated polyesters and acrylic polymers each having a radiation reactive group in the terminal or side chain of the molecule, and monomers having an unsaturated double bond may be used as the radiation-curable composition. If necessary, they may be used in combination with a solvent. Further, the radiation-curable composition may be selected by taking into consideration its affinity with the primer layer. Representative examples of radiation-curable compositions will now be described.

(a) Polyester acrylates and polyester methacrylates:

Examples thereof include Aronix M-5700, Aronix M 6100, Aronix M-6200, Aronix M-6300, Aronix M-6500, Aronix M-7100, Aronix M-8030, Aronix M-8060 and Aronix M-8100 (trade names of products of Toagosei Chemical Industry Co., Ltd.); Viscoat 700 and Viscoat 3700 (trade names of products of Osaka Organic Chemical Industry Limited); and Kayarad HX-220 and Kayarad HX-620 (trade names of Nippon Kayaku Co., Ltd.).

(b) Urethane acrylates and urethane methacrylates:

Examples thereof include Aronix M-1100, Aronix M-1200, Aronix M-1210, Aronix M-1250, Aronix M-1260, Aronix M-1300 and Aronix M-1310 (trade names of products of Toagosei Chemical Industry Co., Ltd.); Viscoat 812, Viscoat 813 and Viscoat 823 (trade names of products of Osaka Organic Chemical Industry Limited); and NK ester U 108-A and NK ester U-4HA (trade names of products of Shin Nakamura Chemical Co., Ltd.).

(c) Monofunctional acrylates and monofunctional methacrylates:

Examples thereof include methyl acrylate, ethyl acrylate, butyl acrylate, 2-ethylhexyl acrylate, 2-hydroxyethyl acrylate, 2-hydroxyethyl methacrylate, 2-hydroxypropyl acrylate, tetrahydrofurfryl acrylate, phenoxyethyl acrylate, cyclohexyl acrylate, cyclohexyl methacrylate, benzyl acrylate, glycidyl methacrylate, N,N-dimethylaminoethyl acrylate, N,N-dimethylaminoethyl methacrylate, N,N-diethylaminoethyl methacrylate, and butoxyethyl acrylate; ethylene oxide-modified phenoxidized phosphoacrylate and ethylene oxide-modified butoxidized phosphoacrylate; and Aronix M-101, Aronix M-102, Aronix M-111, Aronix M-113, Aronix M-114, Aronix M-117, Aronix M-152, and Aronix M-154 which are trade names of products of Toagosei Chemical Industry Co., Ltd.

(d) Polyfunctional acrylates and polyfunctional methacrylates:

Examples thereof include 1,6-hexanediol diacrylate, 1,6-hexanediol dimethacrylate, neopentyl glycol diacrylate, diethylene glycol diacrylate, polyethylene glycol diacrylate, polyethylene glycol dimethacrylate, polypropylene glycol diacrylate, polypropylene glycol dimethacrylate, pentaerythritol diacrylate, trimethylolpropane hexaacrylate, isocyanuric acid diacrylate, pentaerythritol triacrylate, isocyanuric acid triacrylate, trimethylolpropane triacrylate, trimethylolpropane trimethacrylate, ethylene oxide modified pentaerythritol tetraacrylate, propylene oxide. modified trimethylolpropane polyacrylate, and ethylene oxide-modified trimethylolpropane polyacrylate. More specifically, there may be mentioned products of Toagosei Chemical Industry Co., Ltd., for example, Aronix M-210, Aronix M-215, Aronix M-220, Aronix M-233, Aronix M-240, Aronix M-245, Aronix M-305, and Aronix M-309, Aronix M-310, Aronix M-315, Aronix M-320, Aronix M-325, Aronix M-400, and Aronix M-450.

(e) Epoxy compounds:

Examples thereof include glycidyl methacrylate, 1,3-bis(N,N-diepoxypropylaminomethyl)cyclohexane and 1,3-bis(N,N-diepoxypropylaminomethyl)benzene. More specifically, there may be mentioned products of Mitsubishi Gas Chemical Co., Inc., for example, GE-510, TETRAD-X, and TETRAD-C.

(f) Carboxylic modified acrylates:

Carboxylic modified acrylates include monofunctional radiation-curable carboxylic acids and polyfunctional radiation-curable carboxylic acids defined hereinafter.

The monofunctional radiation-curable carboxylic acids have both one radiation-curable functional group and at least one carboxyl group in the terminal or side chain of the molecule, while the polyfunctional radiation-curable carboxylic acids have both two or more radiation-curable functional groups and at least one carboxyl group in the terminal or side chain of the molecule. Examples of the monofunctional radiation-curable carboxylc acids include diethylene glycol monoacrylate monofumarate and trimethylolpropane difumarate monoacrylate. Examples of the polyfunctional radiation-curable carboxylic acids include trimethylolpropane diacrylate fumarate and pentaerythritol diacrylate monofumarate. There may be mentioned products of Toagosei Chemical Industry Co., Ltd., for example, Aronix M-5300, M-5400, M-5500, TO-756, and Dainippon Ink & Chemicals Inc., Grandic EB EXP2101, 2108.

When the polyfunctional radiation-curable carboxylic acids and polyfunctional ones are used as a mixture, the proportion of mixing of the monofunctional radiation-curable carboxylic acid is preferably 5 to 80% by weight, more preferably 10 to 50% by weight based on the total solid content of the mixture. The reason for this is as follows. When the proportion of the monofunctional radiation-curable carboxylic acid is less than 5% by weight, the bottle washing suitability is poor when a label is formed by making use of the support and the label and then immersed in an alkaline solution. On the other hand, when the proportion exceeds 80% by weight, the water-resistance of the label is remarkably lower, which causes the label to crack when immersed in water.

Further, since the above-described monofunctional radiation-curable carboxylic acid is generally less susceptible to volume shrinkage during radiation curing, very excellent curling property can be obtained using it as the radiation-curable anchor layer.

If necessary, a radiation-curable diluent not having a carboxyl group may be poorly added to the radiation-curable mixture for the purpose of lowering the viscosity and improving the coating property of the mixture. The radiation-curable diluent may be any of the compounds having an unsaturated double bond polymerizable by radiation usually used in the art. Specifically, the radiation-curable diluent is a compound having at least one carbon-carbon unsaturated double bond, and examples thereof include compounds having an acryloyl, methacryloyl, acrylamide, allyl, vinyl ether or vinyl thioether group, for example, an alkyl ester of acrylic acid, an alkyl ester of methacrylic acid, acrylonitrile, methacrylonitrile, acrylamide, vinyl acetate, vinyl propionate, and vinyl pyrrolidone. Two or more unsaturated double bonds may exist in the molecule. Especially, there may be mentioned unsaturated esters of polyol, for example, ethylene diacrylate, diethylene glycol diacrylate, glycerol triacrylate, trimethylolpropane, triacrylate, and pentaerythritol tetraacrylate. Further, compounds having at least one epoxy ring, e.g., glycidyl acrylate, etc. are also preferred. Leveling agents, organic solvents, etc. besides the above-described radiation-curable diluent may be incorporated in the radiation-curable mixture.

The coating weight of the radiation-cruable anchor layer used in the present invention is preferably 1 to 10 $g/m^2$. When the weight of the radiation-curable anchor layer is less than the above-described range, it is not possible to completely fill the recessess of the support, which makes the gloss of the layer low. On the other hand, when the weight of the radiation-curable anchor layer exceeds the above-described range, it becomes difficult to remove the label in an alkaline bath, which deteriorates its bottl washing suitability.

In the present invention, when the composition is cured with ultraviolet irradiation, the composition is used in combination with a photopolymerization initiator.

Examples of photopolymerization initiators include ethylanthraquinone, methylbenzoyl formate, 1-hydroxycyclohexyl phenyl ketone, acetophenones such as acetophenone, diethoxyacetophenone, dichloroacetophenone and trichloroacetophenone, o-benzoylmethyl benzoate, benzophenone, Michler's ketone, benzyl, benzoin, benzoin alkyl ether, benzyl dimethyl ketal, tetramethylthiuram monosulfide, xanthone, thioxanthone, and azo compounds. The amount of use of the photopolymerization initiator is usually 0.1 to 10% by weight based on the ultraviolet-curable resin. Storage stabilizers such as hydroquinone may be used in combination with the photopolymerization initiator.

In the present invention, the base paper used in the support may be natural cellulosic paper, synthetic paper prepared from a synthetic fiber or a synthetic resin, or a resin-coated paper comprising a base paper and a water-resistant resin coating layer provided on the surface thereof. Among them, a natural pulp paper mainly composed of a wood pulp such as a softwood pulp, a hardwood pulp or a mixture of a softwood pulp with a hardwood pulp is advantageously used. There is no particular limitation on the thickness of the base paper. However, it is preferred for the base paper to have excellent smoothness, and the weight thereof is preferably 40 to 150 $g/m^2$.

Various polymer compounds and additives may be incorporated in the base paper mainly composed of a natural pulp which is advantageously used in the present invention. Examples of the polymer compounds and additives include dry strength agents such as starch derivatives, polyacrylamide, polyvinyl alcohol derivatives and gelatin, sizing agents such as salts of fatty acids, rosin derivatives and emulsification products of dialkyl ketene dimers, wet strength agents such as melamine resin, urea resin and epoxidized polyamide, stabilizers, pigments, dyes, antioxidants, fluorescent whitening agents, various latices, inorganic electrolytes, and pH adjustors. They may be incorporated in proper combination of two or more of them.

When a radiation-curable resin composition is applied to the above-described base paper, a water-soluble polymer layer and/or a water-dispersed polymer layer (hereinafter often referred to as the "intermediate layer") may be provided for the purpose of preventing the radiation-curable resin composition from penetrating into the base paper. The term "water-soluble polymer" used herein is intended to mean, e.g., the following compounds.

Examples of natural polymers and semi-synthetic polymers include starch, modified starch compounds such as oxidized starch, etherified starch, dialdehyded starch and esterified starch, alginic acid compounds such as sodium alginate and alginic acid propylene glycol ester, casein, gelatin, pullulan, dextran, chitin, chitosan, gum arabic, glue plant (funori), natural gum, dextrin, and modified cellulose compounds such as methyl cellulose, ethyl cellulose, hydroxy.cellulose and carboxymethyl cellulose. Examples of synthetic polymers include modified polyvinyl alcohol compounds such as completely or partially saponified polyvinyl alcohol, acetoacetylated polyvinyl alcohol, a product of esterification of polyvinyl alcohol with polyhydric carboxylic acid, carboxy-modified polyvinyl alcohol, sulfonic acid-modified polyvinyl alcohol, olefin-modified polyvinyl alcohol, nitrile-modified polyvinyl alcohol, amide-modified polyvinyl alcohol, pyrrolidone-modified polyvinyl alcohol, polyethylene glycol, polyacrylic acid compounds such as polyacrylamide, polyacrylic acid, ammonium polyacrylate and sodium polyacrylate, polyvinyl pyrrolidone, polyethylene-imine, polyvinyl ether, polymaleic acid copolymers, and water-soluble alkyd resins.

Examples of the water-dispersed polymers include various latices prepared by dispersing in water a synthetic polymer, such as a styrene/maleic anhydride copolymer, a styrene/butadiene copolymer or a butadiene/methacrylate copolymer. As a water-soluble polymer and a water-dispersed polymer, the above. described polymers may be used alone, or may be mixed with each other and used in the form of a solution.

A pigment may be incorporated into the intermediate layer for the purpose of further improving the smoothness. Representative examples of the pigment include inorganic pigments such as calcium carbonate, silicon dioxide, titanium dioxide, zinc oxide, aluminum oxide, magnesium oxide, aluminum hydroxide, magnesium hydroxide, barium sulfate, zinc sulfate, kaolin, talc, clay, calcined kaolin and calcined clay, and organic pigments such as polyethylene powder, polystyrene powder and urea-formalin resin powder.

Further, if necessary, various additives, such as surface active agents, antifoaming agents, and the like may be added to the coating solution which forms the intermediate layer.

There is no particular limitation on the concentration of the water-soluble polymer and water dispersed polymer. However, the concentration is preferably 5 to 50%, more preferably 10 to 30% based on the total solid content of the coating solution.

There is no particular limitation on the coating weight on a dry basis of the water soluble polymer intermediate layer provided on the base paper. However, the coating weight is preferably 0.1 to 30 g/m$^2$, more preferably 3 to 25 g/m$^2$. When the coating weight is less than 0.1 g/m$^2$, no significant effect of the present invention can be attained and, further, pinholes tend to occur. On the other hand, when the coating amount exceeds 30 g/m$^2$, a large tension is imposed on the base paper during drying, which brings about a large shrinkage, so that it becomes difficult to control the curling.

In the present invention, a surface treatment, such as corona discharge of the surface of the base paper and the like, may be performed for the purpose of improving the adhesion and wettability between the base paper or water-soluble polymer intermediate layer and the radiation-curable anchor layer.

The radiation-curable anchor layer may be applied to the base paper by coating methods such as blade coating, air knife coating, squeeze coating, reverse roll coating, gravure roll coating, transfer roll coating, extrusion coating, curtain coating, and die coating.

In the present invention, radiation irradiation is used for curing the anchor layer. Therefore, the support including the anchor layer should not be exposed to a high temperature, which makes the support less susceptible to curling. Further, in radiation curing, only several seconds are required from the application to the anchor layer to the curing thereof, so that no anchor layer penetrates into the base paper. Therefore, no anchor layer is lost from the surface of the support, and no pinholes occur. When curing of the anchor layer is performed by electron beam irradiation, the surface of the anchor layer is further subjected to mirror finishing by bringing the surface of the anchor layer into contact with a mirror finishing roll and irradiating the back side of the support with an electron beam to cure the anchor layer. Although profitability is remarkably inferior to the method wherein the anchor layer is completely cured through irradiation at one time only, it is possible to employ a method which comprises subjecting the anchor layer to a preliminary electron beam irradiation to partially cure the layer, bringing the partially cured layer into contact with a mirror finishing roll, peeling the layer from the roll, and subjecting the layer to a secondary irradiation to completely cure the layer. When embossing is performed, it is possible to obtain a desired embossed surface, such as a fine or coarse surface, by making use of an embossing roll instead of the mirror finishing roll. Further, it is also possible to employ a method which comprises applying an electron beam-curable composition on a support, placing thereon a synthetic resin or metallic film having a mirror surface or an embossing surface, subjecting the support to an electron beam irradiation from the back side thereof or the side of the film, and peeling the film after curing of the electron beam-curable composition to obtain a surface having a predetermined shape.

In the electron beam irradiation, it is preferred to use an electron beam accelerator at an accelerating voltage of 100 to 1000 KV, more preferably 100 to 300 KV and a one-pass absorbed dose of 0.2 to 10 Mrad. When the accelerating voltage or the electron beam absorbed dose is lower than the above-described range, it is impossible to attain sufficient curing. On the other hand, when the accelerating voltage or the electron beam absorbed dose is higher than the above-described range, not only the energy efficiency is deteriorated but also unfavorable influences on the quality appears such as lowering in the folding endurance of the base paper. Examples of the electron beam accelerator which may be used in the present invention include an electrocurtain system, a scanning type electron beam accelerator, and a double scanning type electron beam accelerator.

An electron beam irradiation in a high oxygen concentration hinders the curing of the electron beam-curable composition. Therefore, it is preferred to perform the irradiation in an atmosphere having an oxygen concentration controlled at 600 ppm or less, preferably 400 ppm or less through replacement with an inert gas such as nitrogen, helium or carbon dioxide.

Examples of the ultraviolet irradiating device include a low-pressure mercury lamp, a medium-pressure mercury lamp, a high-pressure mercury lamp, and a metal halide lamp. Further, an ozoneless type lamp which is less liable to generate ozone may be also employed. In general, a plurality of lamps having an output of 30 W/cm or more are used in parallel with each other.

A label may be prepared by providing a primer layer, a printing layer, and an overcoat layer on the support for an alkali-removable label prepared according to the present invention and, if necessary, providing an adhesive layer on the back side of the support. Alternatively, a metallized layer, a primer layer, a print layer, and an overcoat layer may be provided on the support to prepare a label.

Use of the radiation-curable anchor layer comprising a radiation-curable carboxylic acid and another radiation-curable acrylate in the support for an alkali removable label according to the present invention brings about the following features. When the support for a label after curing through radiation copolymerization is immersed into an alkaline solution to remove the label in washing of a bottle, the anchor layer easily swells and is dissolved, which contributes to excellent alkali removability of the label. Further, the curling property is excellent by virtue of a small volume of shrinkage, and cracking hardly occurs. Further, since the radiation-curable anchor layer is used, the water resistance, gloss and smoothness are excellent, which contributes to excellent metallization. Also, use of the radiation curing makes the support for the label less susceptible to occurrence of pinholes, which prevents the anchor layer from penetrating into the base paper of the support, so that the opacity is not effected.

When an intermediate layer comprising a water. soluble polymer and/or a water.dispersed polymer is used, the resin composition for anchor layer is less liable to penetrate into the base paper. Therefore, in this case, a radiation-curable resin layer is provided on the intermediate layer and can be cured before the resin penetrates into the base, so that the formed support for a label is excellent in smoothness and gloss after printing and further less susceptible to occurrence of pinholes.

When a monofunctional radiation-curable carboxylic acid and a polyfunctional radiation-curable carboxylic acid are used for the radiation-curable anchor layer, immersion of the support for a label after curing of the anchor layer through radiation copolymerization causes the radiation.cured anchor layer to be rapidly swelled without dissolution and washed off in film form, thus enabling the resin layer and the label to be easily removed and causing no deterioration of the alkali solution, so that the alkali solution can be re.used. Further, the support for the label has an alkali releasability comparable with that of a conventional label, is excellent in curling property because of its small volume of shrinkage and, when immersed in water, is less susceptible to cracking because of excellent water resistance.

By virtue of the above-described functions, the support for an alkali-removable label of the present invention has very excellent label suitability derived from the use of a radiation-curable anchor layer containing a radiation-curable carboxylic acid, i.e., has advantages such as excellent bottle washing suitability and curling property, less susceptibility to cracking, excellent water resistance, gloss and smoothness, and less susceptibility to occurrence of a pinhole and a lowering in the opacity.

Further, when an intermediate layer comprising a water-soluble polymer and/or a water.dispersed polymer is provided in the support and a radiation-curable anchor layer comprising a monofunctional radiation-curable carboxylic acid and a polyfunctional radiation-curable carboxylic acid is provided thereon, excellent suitability for washing of a bottle with an alkaline solution is attained. Specifically, when the formed label is immersed in an alkaline solution, the radiation cured anchor layer rapidly swells without dissolution and is washed off in film form, which brings about advantages such as easy removal of the anchor layer and label and less increase in the viscosity of the alkaline solution, so that the alkaline solution can be re.used. Moreover, a further improvement in the water resistance can be attained by virtue of the function of the polyfunctional radiation-curable carboxylic acid.

EXAMPLES

The present invention will now be described in more detail by way of the following Examples. However, the present invention is not limited to the Examples only. "Parts" and "%" used hereinafter are indicated "by weight".

EXAMPLE 1

A Yankee machine-glazed paper having a weight of 70 g/m$^2$ and a clay coated layer provided on the surface thereof was used as a base layer, and radiation-curable compositions having the following composition ratio were applied to it by means of a gravure coater to form a support for an alkali-removable label.

In the radiation-curable resin compositions, isocyanuric acid diacrylate (Aronix M-215, trade name; a product of Toagosei Chemical Industry Co., Ltd.) was used as a radiation-curable acrylate, a dimer of acrylic acid (Aronix M-5600; a product of Toagosei Chemical Industry Co., Ltd.) as a radiation-curable carboxylic acid, and benzyl dimethyl ketal (Irgacure 651; a product of Ciba-Geigy Limited) as a reaction initiator.

| | |
|---|---|
| Sample A: | |
| Radiation-curable acrylate | 93 parts |
| Radiation-curable carboxylic acid | 5 parts |
| Photopolymerization initiator | 2 parts |
| Sample B: | |
| Radiation-curable acrylate | 68 parts |
| Radiation-curable carboxylic acid | 30 parts |
| Photopolymerization initiator | 2 parts |
| Sample C: | |
| Radiation-curable acrylate | 10 parts |
| Radiation-curable carboxylic acid | 88 parts |
| Photopolymerization initiator | 2 part |

The radiation-curable composition-coated supports thus prepared were brought into an ultraviolet irradiation device (80 W/cm; ozoneless condenser type; an irradiation distance of 10 cm) and subjected to an ultraviolet irradiation to prepare supports for a metallized label.

A 400 Å thick aluminum.metallized layer was provided on the supports for a metallized label thus prepared, and a printing layer comprising an ink composed of nitrocellulose as a vehicle and an overcoat layer comprising a nitrocellulose resin were further provided thereon. The metallized labels were evaluated by the following methods.

(1) Cracking and gloss:

A starch glue was applied to the back side of the label. The label was adhered to a beer bottle, dried for 24 hr, and then immersed for 24 hr in cold water to observe the state of the label.

(2) Bottle washing suitability:

A starch glue was applied to the back side of the label. The label was adhered to a beer bottle, dried for 24 hr, allowed to stand for 24 hr, and then immersed in a 1N sodium hydroxide solution at 70° C. to evaluate the bottle washing suitability based on the time taken for washing off the label.

(3) Pinhole:

A starch glue was applied to the back side of the label. The label was adhered to a glass plate, dried for 24 hr, and allowed to stand for 24 hr. The surface of the label was wetted with a solution containing a dye dissolved therein, and the pinhole was evaluated based on the degree of coloring of the back side.

(4) Curling:

The curling property was evaluated based on the curling degree after provision of a radiation-curable anchor layer.

The results of evaluation are shown in Table 1.

EXAMPLE 2

The same support as that of Example 1 was used, except that the proportion of ingredients of the radiation-curable resin composition was changed as follows. The kind and coating weight of the radiation-curable acrylate and the radiation-curable carboxylic acid were the same as those of Sample A.

| | |
|---|---|
| Sample D: | |
| Radiation-curable acrylate | 95 parts |
| Radiation-curable carboxylic acid | 5 parts |
| Sample E: | |
| Radiation-curable acrylate | 70 parts |
| Radiation-curable carboxylic acid | 30 parts |
| Sample F: | |
| Radiation-curable acrylate | 10 parts |
| Radiation-curable carboxylic acid | 90 parts |

The radiation-curable composition-coated supports thus prepared were introduced into an electron beam accelerator (Electrocurtain; a product of ESI) having an atmosphere replaced with nitrogen (oxygen concentration: 200 ppm), wherein an electron beam irradiation was performed under conditions of an acceleration voltage of 175 KV and an absorbed dose of 3 Mrad to prepare supports for a metallized label. Labels were prepared from the thus formed supports for a metallized label in the same manner as that of Example 1.

Results of evaluation are shown in Table 1.

COMPARATIVE EXAMPLE 1

A support for a metallized label was prepared in the same manner as that of Example 1, except that the proportion of ingredients of the radiation-curable composition of Example 1 was changed as follows.

Sample G of radiation-curable composition:

Raw materials used were the same as those of Sample A, and the composition ratio was changed as follows.

| | |
|---|---|
| Radiation-curable acrylate | 95 parts |
| Radiation-curable carboxylic acid | 3 parts |
| Photopolymerization initiator | 2 parts |

A label was prepared from the thus formed support for a metallized label in the same manner as that of Example 1. The results of evaluation are shown in Table 1.

COMPARATIVE EXAMPLE 2

A support for a metallized label was prepared in the same manner as that of Example 2, except that the proportion of ingredients of the radiation-curable composition used in Example 2 was changed as follows.

| Sample H: | |
|---|---|
| Radiation-curable acrylate | 97 parts |
| Radiation-curable carboxylic acid | 3 parts |

A label was prepared from the thus formed support for a metallized label in the same manner as that of Example 1. The results of evaluation are shown in Table 1.

COMPARATIVE EXAMPLE 3

A 40 wt % solution of a resin mixture of a nitrocellulose resin and a fatty acid ester resin was applied to the base paper used in Example 1 (coating weight on a solid basis: 4 g/m$^2$), and the resultant coating was heated and dried at 180° C. for 15 sec to prepare a support for a metallized label (Sample I). A label was prepared from the thus formed support for a metallized label in the same manner as that of Example 1. The results of evaluation are shown in Table 1.

TABLE 1

| | | Sample | Cracking | Gloss | Bottle washing suitability | Pinhole | Curling |
|---|---|---|---|---|---|---|---|
| Ex. | 1 | A | free | excellent | 45 sec | free | good |
| | | B | free | excellent | 35 sec | free | excellent |
| | | C | free | excellent | 25 sec | free | excellent |
| | 2 | D | free | excellent | 45 sec | free | good |
| | | E | free | excellent | 35 sec | free | excellent |
| | | F | free | excellent | 25 sec | free | excellent |
| Comp. Ex. | 1 | G | free | excellent | longer than 1 min | free | excellent |
| | 2 | H | free | excellent | longer than 1 min | free | excellent |
| | 3 | I | occurred | slightly poor | longer than 1 min | occurred | good |

EXAMPLE 3

A Yankee machine-glazed paper of a weight of 68 g/m$^2$ having a clay coated layer to which 0.5 g/m$^2$ (dry base) of gelatin was applied was used as a base layer, and radiation-curable compositions were applied to it in the following composition ratio by emans of a gravure coater to form a support for a label.

In the radiation-curable compositions, isocyanuric acid diacrylate (Aronix M-215, trade name; a product of Toagosei Chemical Industry Co., Ltd.) was used as a radiation-curable acrylate, a dimer of acrylic acid (Aronix M-5600, trade name; a product of Toagosei Chemical Industry Co., Ltd.) as a radiation-curable carboxylic acid, and benzyl dimethyl ketal (Irgacure 651, trade name; a product of Ciba-Geigy Limited) as a reaction inhibitor.

| | |
|---|---|
| Sample J: | |
| Radiation-curable acrylate | 93 parts |
| Radiation-curable carboxylic acid | 5 parts |
| Photopolymerization initiator | 2 parts |
| Sample K: | |
| Radiation-curable acrylate | 68 parts |
| Radiation-curable carboxylic acid | 30 parts |
| Photopolymerization initiator | 2 parts |
| Sample L: | |
| Radiation-curable acrylate | 10 parts |
| Radiation-curable carboxylic acid | 88 parts |
| Photopolymerization initiator | 2 part |

The radiation-curable composition-coated supports thus prepared were introduced into an ultraviolet irradiation device (80 W/cm; ozoneless condenser type; an irradiation distance of 10 cm) and subjected to an ultraviolet irradiation to prepare supports for an alkali-removable label.

A print layer comprising an ink composed of nitrocellulose as a vehicle and an overcoat layer comprising a nitrocellulose resin were provided on the thus formed supports for an alkali-removable label. The labels were evaluated in the same manner as that of Example 1.

The results are shown in Tables 2 and 3.

EXAMPLE 4

The same support as that of Example 3 was used, except that the mixing ratio of ingredients of the radiation-curable composition was changed as follows. The kind and coating weight of the radiation-curable acrylate and the radiation-curable carboxylic acid were the same as those of Sample J.

| | |
|---|---|
| Sample M: | |
| Radiation-curable acrylate | 95 parts |
| Radiation-curable carboxylic acid | 5 parts |
| Sample N: | |
| Radiation-curable acrylate | 70 parts |
| Radiation-curable carboxylic acid | 30 parts |
| Sample O: | |
| Radiation-curable acrylate | 10 parts |
| Radiation-curable carboxylic acid | 90 parts |

The radiation-curable composition-coated supports thus prepared were introduced into an electron beam accelerator (Electrocurtain; a product of ESI) having an atmosphere replaced with nitrogen (oxygen concentration: 200 ppm), wherein an electron beam irradiation was performed under conditions of an acceleration voltage of 175 KV and an absorbed dose of 2 Mrad to prepare supports for an alkali-removable label. These supports were evaluated in the same manner as that of Example 1. Results of evaluation are shown in Tables 2 and 3.

COMPARATIVE EXAMPLE 4

A support for an alkali-removable label was prepared in the same manner as that of Example 3, except that the proportions of ingredients of the radiation-curable composition of Example 3 were changed as follows. The thus formed support for an alkali-removable label was evaluated in the same manner as that of Example 1. The results are shown in Tables 2 and 3.

Sample P of radiation-curable composition:

Raw materials used were the same as those of Sample J, and the composition ratio was changed as follows.

| | |
|---|---|
| Radiation-curable acrylate | 95 parts |
| Radiation-curable carboxylic acid | 3 parts |
| Photopolymerization initiator | 2 parts |

COMPARATIVE EXAMPLE 5

A support for an alkali-removable label was prepared in the same manner as that of Example 4, except that the proportions of ingredients of the radiation-curable composition used in Example 4 were changed as follows. The thus formed support for an alkali-removable label was evaluated in the same manner as that of Example 1. The results are shown in Tables 2 and 3.

| Sample Q: | |
|---|---|
| Radiation-curable acrylate | 97 parts |
| Radiation-curable carboxylic acid | 3 parts |

COMPARATIVE EXAMPLE 6

A 40 wt % solution of a resin mixture of a nitrocellulose resin and a fatty acid ester resin was applied to the base paper used in Example 3 (coating weight on a solid basis: 4 $g/m^2$), and the resultant coating was heated and dried at 180° C. for 15 sec to prepare a support for an alkali-removable label (Sample R). The thus formed support for an alkali-removable label was evaluated in the same manner as that of Example 1. The results are shown in Tables 2 and 3.

TABLE 2

| | Sample | Water resistance | Cracking | Gloss | Adhesion | Bottle washing suitability |
|---|---|---|---|---|---|---|
| Ex. | J | excellent | free | excellent | excellent | 44 sec |
| | K | excellent | free | excellent | excellent | 34 sec |
| | L | fair | free | excellent | excellent | 24 sec |
| | M | excellent | free | excellent | excellent | 43 sec |
| | N | excellent | free | excellent | excellent | 33 sec |
| | O | fair | free | excellent | excellent | 23 sec |
| Comp. Ex. | P | excellent | free | excellent | excellent | longer than 1 min |
| | Q | excellent | free | excellent | excellent | longer than 1 min |
| | R | excellent | occurred | slightly poor | excellent | longer than 1 min |

TABLE 3

| | Sample | Pinhole | curling |
|---|---|---|---|
| Ex. | J | free | good |
| | K | free | excellent |
| | L | free | excellent |
| | M | free | good |
| | N | free | excellent |
| | O | free | excellent |
| | P | free | excellent |
| Comp. | Q | free | excellent |
| Ex. | R | occurred | good |

EXAMPLES 5 TO 8 AND COMPARATIVE EXAMPLES 7 AND 8

(1) Preparation of base layer:

A coating solution having the following composition was applied to the glazed surface of a Yankee machine-glazed paper having a weight of 50 $g/m^2$ so as to have a coating weight of 15 $g/m^2$ on a dry basis. The resultant coating was dried and was subjected to flat finishing by means of a supercalender to prepare a support.

| | |
|---|---|
| Kaolin (Alphacoat, trade name; a product of Anglo-American Clay | 42 parts |
| Oxidized starch (MS-3600, trade name; a product of Nihon Shokuhin Kako Co., Ltd. | 1 part |
| Latex (L-1109, trade name; Asahi Chemical Industry Co., Ltd.) | 7 parts |
| Water | 50 parts |

(2) Formation of radiation-cured anchor layer:

Radiation-curable mixtures having compositions shown in Table 4 were applied on the thus prepared paper to as to have a coating weight of 3 $g/m^2$ by means of a gravure coater.

In the radiation-curable mixture, a dimer of acrylic acid (Aronix M-5600; a product of Toagosei Chemical Industry Co., Ltd.) was used as a monofunctional radiation-curable monocarboxylic acid, and bisphenol A-modified diacrylate dicarboxylic acid (GRANDIC EB Exp. 2101, trade name; a product of Dainippon Ink & Chemicals, Inc.) was used as a polyfunctional radiation-curable dicarboxylic acid.

TABLE 4

| Sample | Monofunctional | Polyfunctional |
|---|---|---|
| Comp. Ex. 7 | 4 parts | 96 parts |
| Ex. 5 | 10 parts | 90 parts |
| Ex. 6 | 30 parts | 70 parts |
| Ex. 7 | 50 parts | 50 parts |
| Ex. 8 | 80 parts | 20 parts |
| Comp. Ex. 8 | 85 parts | 15 parts |

The radiation-curable mixture-coated supports thus prepared were introduced into an electron beam accelerator (Electrocurtain; a product of ESI) having an atmosphere replaced with nitrogen (oxygen concentration: 200 ppm) and subjected to an electron beam irradiation under an acceleration voltage of 175 kV and an absorbed dose of 2 Mrad to prepare supports for an alkali-removable label.

(3) Preparation of samples:

The thus formed supports for an alkali-removable label were subjected to aluminum metallization under a vacuum of $10^{-5}$ Torr so as to have a 300 Å-thick metal coating, thereby preparing samples.

EXAMPLES 9 TO 12 AND COMPARATIVE EXAMPLES 9 AND 10

The compositions of the radiation-curable mixtures were changed as shown in Table 5 and applied to the same base paper as that of Example 5 in the same manner as that of Example 5 so as to have the same coating weight as that of Example 5.

In the radiation-curable mixture, a dimer of acrylic acid (Aronix M-5600; a product of Toagosei Chemical Industry Co., Ltd.) was used as a monofunctional radiation-curable monocarboxylic acid, bisphenol A-modified diacrylate dicarboxylic acid (GRANDIC EB Exp. 2101; a product of Dainippon Ink & Chemicals, Inc.) as a polyfunctional radiation-curable dicarboxylic acid, and benzyl dimethyl ketal (irgacure 651; a product of Ciba-Geigy Limited) as a photopolymerization initiator.

TABLE 5

| Sample | Monofunctional | Polyfunctional | Initiator |
|---|---|---|---|
| Comp. Ex. 9 | 4 parts | 94 parts | 2 parts |
| Ex. 9 | 10 parts | 88 parts | 2 parts |
| Ex. 10 | 30 parts | 68 parts | 2 parts |
| Ex. 11 | 50 parts | 48 parts | 2 parts |
| Ex. 12 | 80 parts | 18 parts | 2 parts |
| Comp. Ex. 10 | 85 parts | 13 parts | 2 parts |

The radiation-curable mixture-coated supports thus prepared were introduced into an ultraviolet irradiation device (80 W/cm; ozoneless condenser type; an irradiation distance of 10 cm) and subjected to an ultraviolet irradiation to prepare supports for an alkali-removable label. Further, aluminum metallization was performed in the same manner as that of Example 5 to prepare samples.

EXAMPLES 13 TO 16 AND COMPARATIVE EXAMPLES 11 AND 12

(1) Preparation of base layer:

A coating solution having the following composition was applied to the glazed surface of a Yankee machine-glazed paper having a weight of 50 g/m$^2$ so as to have a coating weight of 17 g/m$^2$ on a dry basis, and the resultant coating was dried. The coating was further subjected to flat finishing by means of a supercalender to prepare the base layer.

| | |
|---|---|
| Calcium carbonate (Brilliant 15, trade name; a product of Shiraishi Calcium Kaisha Limited) | 42 parts |
| Latex (L-1109, trade name; Asahi Chemical Industry Co., Ltd.) | 8 parts |
| Water | 50 parts |

(2) Formation of radiation-cured anchor layer:

Radiation-curable mixtures having compositions shown in Table 6 were applied to the thus prepared base paper so as to have a coating weight of 3 g/m$^3$ by means of a gravure coater.

In the radiation-curable mixtures, a dimer of acrylic acid (Aronix M-5600; a product of Toagosei Chemical Industry Co., Ltd.) was used as a monofunctional radiation-curable monocarboxylic acid, and bisphenol A-modified diacrylate dicarboxylic acid (GRANDIC EB Exp. 2101; a product of Dainippon Ink & Chemicals, Inc.) was used as a polyfunctional radiation-curable dicarboxylic acid.

The radiation-curable mixture-coated suppots thus prepared were introduced into an electron beam accelerator (Electrocurtain; a product of ESI) having an atmosphere replaced with nitrogen (oxygen concentration: 200 ppm) and subjected to an electron beam irradiation under an acceleration voltage of 175 kV and an absorbed dose of 2 Mrad to prepare supports for an alkali-removable label.

TABLE 6

| Sample | Monofunctional | Polyfunctional |
|---|---|---|
| Comp. Ex. 11 | 4 parts | 96 parts |
| Ex. 13 | 10 parts | 90 parts |
| Ex. 14 | 30 parts | 70 parts |
| Ex. 15 | 50 parts | 50 parts |
| Ex. 16 | 80 parts | 20 parts |
| Comp. Ex. 12 | 85 parts | 15 parts |

(3) Preparation of samples:

The thus formed supports for an alkali-removable label were subjected to aluminum metallization in the same manner as that of Example 5 to prepare samples.

EXAMPLES 17 TO 20 AND COMPARATIVE EXAMPLES 13 AND 14

The compositions of the radiation-curable mixtures were changed as shown in Table 7 and applied to the same support as that of Example 13 in the same manner as that of Example 13 so as to have the same coating weight as that of Example 13.

In the radiation-curable mixtures, a dimer of acrylic acid (Aronix M-5600; a product of Toagosei Chemical Industry Co., Ltd.) was used as a monofunctional radiation-curable monocarboxylic acid, bisphenol A-modified diacrylate dicarboxylic acid (GRANDIC EB Exp.

2101; a product of Dainippon Ink & Chemicals, Inc.) as a polyfunctional radiation-curable dicarboxylic acid, and benzyl dimethyl ketal (Irgacure 651; a product of Ciba-Geigy Limited) as a photopolymerization initiator. The radiation-curable mixture-coated supports thus prepared were introduced into an ultraviolet irradiation device (80 W/cm; ozoneless condenser type; an irradiation distance of 10 cm) and subjected to an ultraviolet irradiation to prepare supports for an alkali-removable label. Further, aluminum metallization was performed in the same manner as that of Example 5 to prepare samples.

TABLE 7

| Sample | Monofunctional | Polyfunctional | Initiator |
|---|---|---|---|
| Comp. Ex. 13 | 4 parts | 94 parts | 2 parts |
| Ex. 17 | 10 parts | 88 parts | 2 parts |
| Ex. 18 | 30 parts | 68 parts | 2 parts |
| Ex. 19 | 50 parts | 48 parts | 2 parts |
| Ex. 20 | 80 parts | 18 parts | 2 parts |
| Comp. Ex. 14 | 85 parts | 13 parts | 2 parts |

COMPARATIVE EXAMPLE 15

A sample was prepared in the same manner as that of Example 5, except that the composition of the radiation-curable composition was changed as follows.

| | |
|---|---|
| Monofunctional radiation-curable monocarboxylic acid (Aronix M-5600; a product of Toagosei Chemical Industry Co., Ltd.) | 50 parts |
| Radiation-curable acrylate (Aronix M-7100, trade name; a product of Toagosei Chemical Industry Co., Ltd.) | 50 parts |

COMPARATIVE EXAMPLE 16

A 40 wt % solution of a resin mixture of a nitrocellulose resin with a fatty acid ester resin was applied to the base paper used in Example b 5 (coating weight on a solid basis: 4 g/m$^2$), and the resultant coating was heated and dried at 180° C. for 15 sec to prepare a support for an alkali-removable label. The support was subjected to aluminum metallization in the same manner as that of Example 5 to prepare a sample.

Samples prepared in Examples 5 to 20 and Comparative Examples 7 to 14 were evaluated by the following tests.

Test 1 (water resistance):

A starch glue was applied to the back side of the label. The samples were adhered to a beer bottle, dried for 24 hr, allowed to stand for 24 hr, and then immersed in cold water to evaluate the water resistance. The results are shown in Tables 8, 9 and 10 wherein the water resistance was regarded as good and expressed as ○ when the sample was not removed from the beer bottle 24 hr after initiation of immersion, regarded as poor and expressed as X when the sample was removed from the beer bottle, and regarded as excellent and expressed as ◎ when the sample was not removed even after additional 24 hr.

24 hr after immersion of the bottles in cold water, the state of the metallized surface was observed with a magnifier. The results are shown in Tables 8, 9 and 10 wherein the cracking property was expressed as ○ when no change was observed and expressed as X when cracking was observed.

Test 2 (Bottle washing suitability):

A starch glue was applied to the back side of the label. The samples were adhered to a beer bottle, dried for 24 hr, allowed to stand for 24 hr, and then immersed in a 1N sodium hydroxide solution at 70° C. The bottle washing suitability was evaluated based on the time necessary for the sample to be washed off from the bottle and the state of removal of the anchor layer. The state of removal is shown together with the removing time in Tables 8, 9 and 10 wherein the state of removing of the anchor layer was expressed as ○ when the anchor layer was swelled and washed off in a film form, expressed as ◎ when the film strength was excellent, expressed as X when the anchor layer was dissolved, and expressed as Δ when the degree of swelling was small.

TABLE 8

| Sample | Water resistance | Cracking | State of peeling | Removing time |
|---|---|---|---|---|
| Electron beam | | | | |
| Comp. Ex. 7 | ◎ | ○ | Δ | 2 min or longer |
| Ex. 5 | ◎ | ○ | ◎ | 79 sec |
| Ex. 6 | ◎ | ○ | ◎ | 36 sec |
| Ex. 7 | ◎ | ○ | ◎ | 29 sec |
| Ex. 8 | ○ | ○ | ○ | 24 sec |
| Comp. Ex. 8 | X | X | X | 20 sec |
| Ultra-violet | | | | |
| Comp. Ex. 9 | ◎ | ○ | Δ | 2 min or longer |
| Ex. 9 | ◎ | ○ | ◎ | 74 sec |
| Ex. 10 | ◎ | ○ | ◎ | 33 sec |
| Ex. 11 | ◎ | ○ | ◎ | 26 sec |
| Ex. 12 | ○ | ○ | ○ | 20 sec |
| Comp. Ex. 10 | X | X | X | 17 sec |

TABLE 9

| Sample | Water resistance | Cracking | State of peeling | Removing time |
|---|---|---|---|---|
| Electron beam | | | | |
| Comp. Ex. 11 | ◎ | ○ | Δ | 2 min or longer |
| Ex. 13 | ◎ | ○ | ◎ | 72 sec |
| Ex. 14 | ◎ | ○ | ◎ | 30 sec |
| Ex. 15 | ◎ | ○ | ◎ | 27 sec |
| Ex. 16 | ○ | ○ | ○ | 22 sec |
| Comp. Ex. 12 | X | X | X | 16 sec |
| Ultra-violet | | | | |
| Comp. Ex. 13 | ◎ | ○ | Δ | 2 min or longer |
| Ex. 17 | ◎ | ○ | ◎ | 68 sec |
| Ex. 18 | ◎ | ○ | ◎ | 28 sec |
| Ex. 19 | ◎ | ○ | ◎ | 24 sec |
| Ex. 20 | ○ | ○ | ○ | 20 sec |
| Comp. Ex. 14 | X | X | X | 14 sec |

TABLE 10

| Sample | Water resistance | Cracking | State of peeling | Removing time |
|---|---|---|---|---|
| Electron beam | | | | |
| Comp. Ex. 15 | X | X | X | 45 sec |
| Comp. | ○ | ○ | Δ | 2 min or |

TABLE 10-continued

| Sample | Water resistance | Cracking | State of peeling | Removing time |
|---|---|---|---|---|
| Ex. 16 | | | | longer |

What is claimed is:

1. A support for an alkali-removable label comprising a base paper layer and an anchor layer on at least one side thereof of a radiation-curable composition cured in place on the paper layer, said composition comprising at least one radiation-curable monomer and a radiation-curable carboxylic acid.

2. The support of claim 1, wherein the composition is cured by electron beam radiation.

3. The support of claim 1, wherein the composition includes a photopolymerization initiator and the composition is cured by ultraviolet ray radiation.

4. The support of claim 1, wherein the radiation-curable monomer is selected from the group consisting of radiation-curable acrylates and methacrylates and the radiation-curable carboxylic acid is acrylic acid.

5. A metallized alkali-removable label which comprises the support of claim 1 having on the anchor layer, successively, a metal-evaporated layer, a primer layer, a printing layer and an overcoat layer.

6. An alkali-removable label which comprises the support of claim 1 having on the anchor layer, successively, a primer layer, a printing layer and an overcoat layer.

7. A support for an alkali-removable label, comprising a base paper layer, an intermediate layer comprising a water-soluble polymer or a water-dispersed polymer or mixtures thereof on at least one surfrace of said paper layer and an anchor layer on said intermediate layer of a radiation-curable composition cured in place on said intermediate layer and comprising a radiation-curable carboxylic acid.

8. The support of claim 7, wherein said composition is cured by electron beam radiation.

9. The support of claim 7, wherein the composition includes a photopolymerization initiator and the composition is cured by ultraviolet ray radiation.

10. A metallized alkali-removabl label comprising the support of claim 7 having on the anchor layer, successively, a metal-evaporated layer, a primer layer, a printing layer and an overcoat layer.

11. An alkali-removable label comprising the support of claim 7 having on the anchor layer, successively, a primer layer, a print layer and an overcoat layer.

12. A support for an alkali-removable label comprising a base paper layer, an intermediate layer comprising a water-soluble polymer or a water-dispersed polymer or mixtures thereof on at least one surface of said paper layer and an anchor layer on said intermediate layer cured in place on said intermediate layer of a radiation-curable composition comprising a mixture of a monofunctional radiation-curable carboxylic acid and a polyfunctional radiation-curable carboxylic acid.

13. The support of claim 12, wherein the content of the monofunctional radiation-curable carboxylic acid in the composition is from 5 to 80% by weight.

14. The support of claim 12, wherein said composition is cured by electron beam radiation.

15. The support of claim 12, wherein said composition includes a photopolymerization initiator and is cured by ultraviolet ray radiationa.

16. The support of claim 12, wherien said monofunctional carboxylic acid is acrlic acid and said polyfunctional carboxylic acid is bisphenol A modified diacrylate dicarboxylic acid.

17. A metallized alkali-removable label comprising the support of claim 12 having on the anchor layer, successively, a metal-evaporated layer, a primer layer, a printing layer and an overcoat layer.

18. An alkali-removable label comprising the support of claim 12 having on the anchor layer, successively, a primer layer, a printing layer and an overcoat layer.

* * * * *

UNITED STATES PATENT AND TRADEMARK OFFICE

CERTIFICATE OF CORRECTION

PATENT NO. : 5,096,767

DATED : March 17, 1992

INVENTOR(S) : Junji Harada et al.

It is certified that error appears in the above-identified patent and that said Letters Patent is hereby corrected as shown below:

Claim 10, column 20, line 6, change "alkali-removabl" to --alkali-removable--.

Claim 15, column 20, line 29, change "radiationa" to --radiation--.

Claim 16, column 20, line 31, change "acrlic" to --acrylic--.

In addition, Col 20 line 30, "wherien" should read --wherein--.

Signed and Sealed this

Tenth Day of August, 1993

Attest:

MICHAEL K. KIRK

Attesting Officer

Acting Commissioner of Patents and Trademarks